United States Patent

[11] 3,622,367

[72] Inventors Werner O. Haag
Trenton;
Darrell Duayne Whitehurst, Titusville, both of N.J.
[21] Appl. No. 22,362
[22] Filed Mar. 24, 1970
[45] Patented Nov. 23, 1971
[73] Assignee Mobil Oil Corporation
Continuation-in-part of application Ser. No. 647,221, June 19, 1967, now abandoned. This application Mar. 24, 1970, Ser. No. 22,362

[54] CONTACT DEPOSITION OF PLATINUM AND OTHER METALS
23 Claims, No Drawings

[52] U.S. Cl.............................................. 117/37 R, 106/1, 117/47 R, 117/47 A, 117/100 B, 117/100 A, 117/100 C, 117/100 M, 117/100 S, 117/138.8 R, 117/138.8 G, 117/138.8 E, 117/160 R, 260/429 R, 260/429 CY
[51] Int. Cl............................................................ C23c 17/02
[50] Field of Search.................................... 117/47 R, 47 A, 54, 100, 113, 160 R; 260/429 R; 106/1; 117/37 R, 138.8 R, 138.8 G, 138.8 E

[56] References Cited
UNITED STATES PATENTS

| | | | |
|---|---|---|---|
| 2,702,253 | 2/1955 | Bergstrom | 117/554 |
| 2,719,799 | 10/1955 | Rosenblatt et al. | 117/54 X |
| 2,853,398 | 9/1958 | Mackiw et al. | 117/47 |
| 2,922,803 | 1/1960 | Kaufman | 260/429 |
| 2,930,807 | 4/1961 | Case | 260/429 X |
| 3,083,109 | 3/1963 | Rhodes et al. | 117/160 X |
| 3,147,154 | 9/1964 | Cole et al. | 117/113 X |
| 3,151,140 | 9/1964 | Hubel et al. | 260/429 X |
| 3,159,658 | 12/1964 | Fischer et al. | 260/429 |
| 3,265,520 | 8/1966 | Obenschain | 117/160 X |
| 3,295,999 | 11/1967 | Klein et al. | 117/47 x |
| 3,402,067 | 9/1966 | Langley | 117/160 X |
| 3,415,666 | 12/1968 | Nagai et al. | 106/1 |
| 3,418,346 | 12/1968 | Parshall | 106/1 |
| 3,457,089 | 7/1969 | Shipley et al. | 106/1 |
| 2,980,741 | 4/1961 | Zeiss et al. | 260/429 X |
| 3,265,526 | 8/1966 | Beer | 117/100 X |
| 3,387,009 | 6/1968 | Bublitz et al. | 260/429 |

FOREIGN PATENTS

| | | | |
|---|---|---|---|
| 676,894 | 12/1963 | Canada | 117/54 |
| 1,028,408 | 5/1966 | Great Britain | 260/429 |
| 1,058,679 | 2/1967 | Great Britain | 260/429 |

*Primary Examiner*—William D. Martin
*Assistant Examiner*—Mathew R. P. Perrone, Jr.
*Attorneys*—Frederick E. Dumoulin, William J. Scherback, Oswald G. Hayes and Andrew L. Gaboriault

ABSTRACT: A method is provided for the deposition of a metal on a substrate. The substrate has active surfaces and deposition is effected by mixing the substrate with a solution containing an alcohol and a metal pi-complex having at least one ligand in the form of an organic group containing at least one carbon-to-carbon multiple bond. The metal pi-complex decomposes on the active surfaces, thereby depositing the elemental metal on the active surfaces.

CONTACT DEPOSITION OF PLATINUM AND OTHER METALS

CROSS-REFERENCES TO RELATED APPLICATIONS

This is a continuation-in-part of our copending application Ser. No. 647,221, filed June 19, 1967, now abandoned.

Certain products of the method are useful as catalysts in reactions set forth in copending application Ser. No. 672,008, filed Oct. 2, 1967, now abandoned in favor of application Ser. No. 57,796, filed July 23, 1970, and certain products are useful as substrates for the deposition method described in copending application Ser. No. 647,222, filed June 19, 1967, now abandoned in favor of application Ser. No. 34,863, filed May 5, 1970.

BACKGROUND OF THE INVENTION

1. The field of the invention comprises metal deposition, including a method and the resulting product.

2. There is an increasing search for ways of coating objects which cannot be electroplated, either because they are nonconductors, like plastics, or because they are too small to attach electrodes economically, like printed circuits. For depositing metals on specialized surfaces like the foregoing, the method of contact deposition described herein is of value, being characterized by the fact that it involves but a single step, by being performable continuously and without waste of valuable metal, and by its selective action on activated surfaces.

SUMMARY OF THE INVENTION

A metal preferably of Groups IB, IIIA, IVB, VB, VIB, VIIB, and VIII of the periodic table is deposited on activated surfaces of, preferably, a particulate substrate in a single step involving the surface-induced decomposition of a metal pi-complex. The complex is dissolved in a solution containing an alcohol.

DESCRIPTION OF THE SPECIFIC EMBODIMENTS

The useful metal pi-complexes are broadly characterized by the presence of a central or nuclear metal atom having bonded thereto at least one ligand in the form of an organic group containing at least one carbon-to-carbon multiple bond. By virtue of the multiple bond, which is either a double or a triple bond, the group is bonded to the metal through the pi-electrons of the bond, the resulting attachment being described as a coordinate covalent bond. The sigma electrons of the multiple bond provide a carbon-to-carbon attachment described as a covalent bond. The unsaturated organic group is preferably an unsaturated hydrocarbon group, and it may have one, two, or more of said multiple bonds. The central metal atom is preferably platinum, palladium, or other transition metal.

Usually, and as is preferred, the complex also contains one or more other ligands different from said organic group and which may be either anionic or neutral, and preferably singly charged, such as a halide ion. A specific illustrative complex is 1,5-cyclooctadieneplatinum(II) dichloride, the structure of which may be represented as follows:

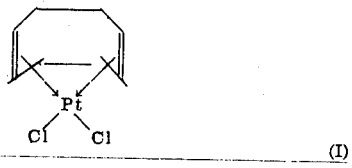

(I)

where the arrows represent coordinate covalent bonds linking the double bonds of the hydrocarbon moiety to the Pt, and the Cl atoms are connected to the Pt by covalent bonds. A convenient and illustrative way of defining the useful complexes is by means of the expression $$R_m M X_n \quad (II)$$

where R is the unsaturated organic group or ligand, M is the central metal atom, X is the anionic or neutral ligand described above as the "other" ligand, and $m$ and $n$ are integers.

As indicated, R is preferably an unsaturated hydrocarbon group, which may or may not be substituted by one or more substituents. Preferred unsaturated hydrocarbon groups are olefinic ligands derived from open chain monoolefins having two to 20 or more carbon atoms, including ethylene, propylene, the butenes, pentenes, hexenes, heptenes, octenes, decenes, etc. Also preferred are open chain diolefins having three to 24 carbons, particularly unconjugated diolefins like 1,5-dienes, and including allene, butadiene, isoprene, pentadiene, hexadiene, heptadiene, diisobutenyl, decadiene, and the like. Other preferred unsaturated hydrocarbon groups are derived from open chain olefins having more than two double bonds, sometimes designated oligo-olefins, such as hexatriene, 2,6-dimethyl-2,4,6-octatriene, etc. Also preferred are cyclic diolefins and cyclic oligo-olefins, particularly unconjugated compounds like 1,5-cyclodienes, and including cyclobutadiene, cyclopentadiene, fulvene, norbornadiene, cyclooctadiene, 4-vinylcyclohexene, limonene, dipentene, dicyclopentadiene, cycloheptatriene, cyclooctatriene, bicyclo(2.2.2)octa-2,5,7-triene, cyclonona-1,4,7-triene, cyclooctatetraene, and the like. Also useful are groups derived from heterocyclic di- and oligo-olefins like "heterocyclopentadiene", which is intended to refer to all five-membered ring systems in which a hetero atom like phosphorus, oxygen, iron, nickel, cobalt, etc., replaces a methylene group of cyclopentadiene. Other suitable unsaturated hydrocarbon groups are derived from the acetylenes such as the hexadiynes, heptadiynes, octadiynes, 1,8-nonadiyne, 4,6-decadiyne, dodecatriyne, and the like. Unsaturated hydrocarbon groups having both double and triple bonds are of value, such as butenyne, 1,6-heptadiene-3-yne, 3,6-dimethyl-2,6-octadien-4-yne, 1,7-octaenyne, etc. Or a mixture of an olefinic ligand and an acetylenic ligand of the foregoing types may be suitable.

It may be seen that R, the unsaturated hydrocarbon group, may have one, two, or more double and/or triple bonds, and may have an open chain or a cyclic structure. In some cases, R may be an unsaturated cyclic or heterocyclic having one double bond; or it may be an aromatic ligand like benzene or phenyl. It was also indicated that R may have various substituents, and these may include alkyl, aryl, alkoxy, halogen, carboxyl, ester, keto, and the like, it being understood that, as so substituted, the resulting substituted R group is capable of pi-electron bonding to the metal M.

In formula (II), the atom M is a metal. Metals which may be employed are preferably those of groups IB, IIIA, IVB, VB, VIB, VIIB, and VIII of the periodic table. Copper, silver, and gold are in group IB. Boron, aluminum, gallium, indium, and thallium are in group IIIA. Titanium, zirconium, and hafnium are in group IVB. Vanadium, niobium, and tantalum are in group VB. Chromium, molybdenum, and tungsten are in group VIB. Manganese and rhenium are in group VIIB. Iron, cobalt, nickel, ruthenium, rhodium, palladium, osmium, iridium, and platinum are in group VIII. Particularly preferred metals are silver, gold, aluminum, titanium, vanadium, chromium, molybdenum, tungsten, manganese, rhenium, nickel, ruthenium, rhodium, palladium, osmium, iridium, and platinum. Of these, aluminum, nickel, and platinum are to be preferred over the others.

Group X of formula (II) is preferably a halide like $Cl^-$, $Br^-$, $F^-$, and $I^-$. Other suitable groups are alkyl, acyl, acyloxy, amine, ammonia, alkyl sulfide, aryl sulfide, carbonyl, cyanide, isocyanide, hydrogen sulfide, nitrosyl, hydroxy, phosphine, thiocarbonyl, thionitrosyl, and water. Also amide, aryloxy, aroyl, aroyloxy, alkoxy, hydride, hydrogen sulfite, thiocyanate, etc.

Group R of formula (II) is an anionic group if it loses a proton; and if no proton is lost, it is treated as a neutral group.

In computing the oxidation number of the central metal atom, the group R, if anionic, is counted as negative; if neutral, it is counted as having zero charge.

In general, it may be noted that the preferred ligands R and X are those that do not contaminate the metal surface, either because of their nature, such as alkoxy and acyloxy ligands, or because they pass off as gases, such as Cl and Br which pass off as HCl and HBr, or because they are converted under reaction conditions to compounds that do not contaminate, such as olefins and dienes.

The 8, of R and X ligands are denoted by the subscripts $m$ and $n$; thus $m$ may vary from 1 to 8, and $n$ from 7 to 0, while their sum varies from 2 to 8. These variations, of course, are determined by the nature of the metal M and by its state of oxidation. The oxidation state of the metals as a range may range from 0 to 8, it being understood, as a glance at the periodic table will show, that some metals exhibit more oxidation states than others. It should be remembered that some ligands may have two bonds attached thereto. It will be seen that at least one R group is always present in formula (II). When $n$ is 0, the formula becomes $R_mM$, where $m$ may vary from 2 to 8; in complexes of this type, M is usually a metal of group VIII or is chosen from chromium, titanium, rhenium, or vanadium. Preferred complexes are denoted by such formulas as $RMX_2$, $RMX_4$, $RMX_6$, $R_2MX_2$, $R_2MX_4$, and $R_2MX_6$.

Generally, and as is preferred, the useful complexes have one central or nuclear metal atom; however, the invention also contemplates complexes having two such atoms, either the same or different, as in azulenehexacarbonyldimolybdenum, $C_{10}H_8Mo_2(CO)_6$, or 1,3-bis-(styrene)-2,4-dichloro-mu-dichlorodiplatinum(II), $C_{16}H_{16}Pt_2Cl_4$, and the complex is designated a dinuclear complex.

Some illustrative complexes may be listed as follows:
1. dicyclopentadieneplatinum(II) dichloride
2. 1,3-butadienepalladium(II) dichloride
3. 1,3,5-cycloheptatrieneplatinum(II) dichloride
4. norbornadienepalladium(II) dibromide
5. 1,3,5,7-cyclooctatetraeneplatinum(II) dibromide
6. 2,5-dimethyl-1,5-hexadieneplatinum(II) dichloride
7. bis($\pi$-allylnickel iodide)
8. 1,5-cyclooctadienegold(III) trichloride
9. 1,3-bis(ethylene)-2,4-dichloro-mu,mu-dichlorodiplatinum(II)
10. 1,3-bis(styrene)-2,4-dichloro-mu,mu-dichlorodiplatinum(II)

A complex like No. 1 may be prepared by adding Zeise's acid, $H(C_2H_4PtCl_3)$, to dicyclopentadiene and refluxing for several hours, thereby to precipitate the complex. A complex like No. 2 may be prepared by using the method of Kharasch et al. JACS 60 882–4 (1938), as extended in inorganic synthesis VI 218–9, which involves using palladium (II) chloride as a starting material, reacting this with benzonitrile, and then reacting the resulting product with 1,3-butadiene. No. 9 may be prepared by the method of Kharasch et al., cited. When carbonyl groups are present, as ligands, the corresponding metal carbonyl may be used as a starting compound and reacted with a suitable olefinic material. Other methods for preparing the complexes are available.

Turning to the deposition method, the desired complex may be suitably dissolved in a nonaqueous solvent, and an alcohol added to the solution. The alcohol frequently may also itself serve as the solvent. The substrate in particulate form is added, with good stirring, and on contact of the complex with the substrate surfaces, a surface-induced decomposition of the complex takes place to produce elemental metal, which then selectively deposits on the substrate surfaces. The coated substrate comprises the desired product and may be recovered.

It will be appreciated that deposition of more than one elemental metal may be effected simultaneously on the substrate surfaces. In this embodiment of the invention, a solution containing an alcohol and two or more complexes having different central or nuclear metal atoms are contacted with the substrate surfaces. Each of the metals will deposit on the substrate surfaces and the deposited metal will be in the form of a mixture, or alloy, of the metals. Thus, for example, if it is desired to deposit a mixture, or alloy, of platinum and palladium, the substrate is contacted with a solution containing an alcohol and a pi-complex of platinum and a pi-complex of palladium.

It may be seen that the desired action, i.e., decomposition of the complex and deposition of the resulting metal on the substrate, takes place as the result of a single step, namely, bringing the dissolved complex into contact with the substrate. The substrate surfaces catalyze this action, and in order to do so they should have active or activated surfaces. All metal oxides are considered to be suitable substrates, and also crystalline aluminosilicate molecular sieves. Resins that have been treated with an acid or base, such as ion exchange resins, are suitable because they thus acquire activated surfaces; also included are resins that have been so treated merely to acquire acidic or basic surfaces. The invention further contemplates acid-acting and base-acting solids chosen from organic and inorganic salts, acids, and bases, and also organic solids in general that have acidic or basic surfaces, provided that these surfaces or solids, as well as those previously described, are insoluble in the deposition solution and are nonreactive with either the solution or the deposited metal. As may be apparent, some substrates, such as a metal oxide like alumina, have natural active surfaces, while other substrates may require appropriate treatment to develop active or activated surfaces. Deposition of metal takes place selectively only on such activated surfaces; thus substantially no metal is lost to the external solution or deposits on the walls of the vessel; and in a mixture of activated and nonactivated substrates, only the former would receive a deposit. Similarly, if the same substrate had both activated and nonactivated surfaces, only the former would receive metal.

The substrate may be a porous or nonporous material which, as indicated, is insoluble in the solution of the complex. It may have any suitable shape, ranging from a powdered or granular material to larger objects, including screens and sheet material, but preferably it is a finely divided solid, particularly a material having a particle size in the colloid size range, i.e., in the range of 10 to 10,000 Angstrom units. Another suitable size range is from 0.5 micron to 0.25 inch. Desirably the substrate is a material or object or device which, when coated with metal, forms a useful product such as a catalyst, an electronic component, a metallized particle, etc. Or the resulting coated product may be useful as a substrate in a subsequent metal deposition operation, such as an electroless deposition step. Metal oxides comprise a preferred class of substrate materials as they generally exhibit an active surface, i.e., one able to catalyze complex decomposition and metal deposition. Of these, oxides like porous gamma-alumina, nonporous alpha-alumina, chromia-alumina, chromia, silica-alumina, magnesia, calcia, zirconia, germania, ceria, molybdena, titania, lanthanum oxide, and the various crystalline aluminosilicate molecular sieves, both natural and synthetic, are of particular value. Another preferred class of substrates are ion exchange resins containing acid or basic functional groups, such as cation exchange resins containing phenolic, phenolsulfonic, carboxylic, and sulfonic acid functional groups, and anion exchange resins containing primary, secondary, tertiary, and quaternary amine functional groups. Illustrative resins for making these ion exchange resins include cross-linked polystyrene, phenolic resins, copolymers of styrene and divinylbenzene, guanidine-formaldehyde reaction products, etc.

If a substrate material does not originally have active surfaces, it may be treated to provide them. As treating agents, acidic or basic agents may be used but should not, of course, dissolve or decompose the material to any appreciable extent; thus, agents like the following may be useful: sulfuric acid, chlorosulfonic acid, sulfuryl chloride, thionyl chloride, phosphoric acid, sodium hydroxide, chloramine, ethyleneimine, etc. The treatment comprises applying the agent to the surfaces of the material for a time sufficient to produce a change in such surfaces, after which the agent is removed. The surfaces may then be washed. Substrates that may be activated include polystyrene, polyethylene, polypropylene, polyesters, polyamides, polyacrylonitriles, acrylonitrile-butadiene-styrene terpolymer (ABS), etc. As an example of a treatment effective to produce a desired change, polystyrene particles were treated with sulfuric acid at 100° C. for 2 minutes, giving a suitably activated polystyrene substrate. Substantially the same treatment may be applied to the other described materials using any of the other agents. Complete or partial activation of the substrate material is possible.

Suitable alcohols are normally liquid, preferably primary and secondary alcohols, either aliphatic or cyclic, which may or may not be substituted by various groups. Illustrative aliphatic alcohols include ethanol, propanol, 1-butanol, 2-butanol, 1-pentanol, 3-pentanol, and further including the C6, C7, C8, C9, C10, and higher molecular weight, normally liquid alcohols. Cyclic alcohols include compounds like benzyl and phenethyl alcohols, cyclopentanol, cyclohexanol, etc. Heterocyclic alcohols are suitable as illustrated by furfuryl alcohol. These alcohols act to reduce or decompose the complex, and frequently are capable of dissolving it. If a substituted alcohol is used, it may have any substituent group which is inert to the described action, such as alkyl, aryl, alkoxy, halogen, and the like. Other useful alcohols include various alkylene glycols and polyoxyalkylene glycols which, if normally solid, may be dissolved in a suitable solvent. Polyols like glycerol and various sugars are also of use. In general, and other things being equal, the more volatile alcohols are preferred because easier to remove from the product.

Preferably an alcohol is used as solvent as well as to aid in reducing the complex. If no suitable alcohol solvent is at hand, a nonalcohol solvent is used and may be chosen from such compounds as paraffinic and aromatic hydrocarbons, halogenated hydrocarbons, nitroalkanes, ethers, esters, ketones, etc. Use of a nonalcohol solvent may be advantageous to aid in controlling various characteristics of the deposit, such as the smoothness or roughness, adherence, porosity, distribution, brightness, etc.

The temperature of the deposition step may vary from room temperature, or somewhat below, to refluxing temperatures, provided that the thermal decomposition temperature of the complex, which may extend to 200° or 300° C., is not exceeded. The time required for the step depends on the complex and its amount, among other factors; generally it may extend over a period of several minutes to several hours. Pressure may be used to maintain liquid phase conditions. In respect of concentration of the complex in the deposition solution, it may be noted that higher concentrations favor higher deposition rates. Both lower and higher concentrations are useful to deposit small amounts of metal, but at lower concentrations less control is involved. Numerically, the concentration may vary over a wide range, going from about 0.01 percent by weight, or less, to saturation. As for the substrate concentration, there are no practical limits. The deposits may range from about 1 or 2 percent, or even to 10 percent or more, by weight of the substrate, depending on the surface area and on the number of active sites. The lower concentration limit of the deposit may extend to 0.1 percent or 0.01 percent, or 0.001 percent or less, by weight. The layer of deposited metal may be quite thin, going down to a few Angstroms, and of course may be thicker. The invention is of particular value for preparing catalysts comprising finely divided supports having a thin layer of catalytic metal; in many cases the resulting product comprises a finished catalyst with utility for catalyzing various reactions like hydrogenation and oxidation as set forth in said copending application Ser. No. 672,008 filed Oct. 2, 1967. In other cases the coated substrate may be subjected to another metal deposition step, such as that described in said copending application Ser. No. 647,222 filed June 19, 1967, wherein the metal may be the same or different from the metal already on the substrate.

It is to be noted that both porous and nonporous substrates may be coated. Where the substrate particles are porous, metal can be deposited either on their exterior surfaces or uniformly throughout their interior surfaces, depending on the relative rate of diffusion into the pores and the rate of decomposition of the complex. A slow diffusion rate and fast decomposition rate favor deposition on the exterior boundary of the particles, while a fast diffusion rate and slow decomposition rate favor decomposition uniformly in the pores. Higher temperatures favor decomposition on the exterior boundary, while lower temperatures favor deposition in the pores.

Owing to the selectivity of the method, as described, it is feasible to deposit metal on desired substrate particles, i.e., having active or activated surfaces, when they are admixed with other particles having nonactive or nonactivated surfaces. An a selective deposition may be obtained on a single substrate having both activated and nonactivated surfaces.

Any suitable technique for carrying out the method may be employed. For example, a slurry or colloidal suspension of the solid substrate particles in the solution of the complex may be continuously passed through a reactor, held at the desired temperature, where decomposition of the complex and decomposition of metal takes place, and the coated particles may then be recovered as by filtration, sedimentation, or the like. Or the substrate particles may be disposed in a vessel or column and the complex-containing solution continuously passed therethrough. This latter procedure is useful for in situ deposition of metal on catalysts that require replenishment. Batch deposition techniques are of course permissible.

The invention may be illustrated by the following examples.

EXAMPLE 1

Zeise's acid, $H(C_2H_4PtCl_3)$, was made by mixing for 30 minutes a solution of 3.175 g. sodium chloride in 20 ml. distilled water with a solution of 13.996 g. chloroplatinic acid in 20 ml. distilled water. The mixture was evaporated to dryness, 100 ml. absolute ethanol added, evaporated again, another 100 ml. of the alcohol added, the mixture refluxed overnight, filtered, and the filtrate diluted to 100 ml. with ethanol. Solids comprising sodium chloride were filtered off, and the remaining liquid comprised Zeise's acid dissolved in alcohol. Zeise's compound, 1,3-bis-(ethylene)-2,4-dichloro-mu,mu-dichloroplatinum(II), was obtained by neutralization of Zeise's acid.

EXAMPLE 2

A platinum pi-complex was prepared by adding 10 ml. 1,5-cyclooctadiene to 50 ml. Zeise's acid and refluxing overnight. The mixture was filtered, the solids washed with ethanol and ether, and dried in vacuo. A yield of 5.35 g. of 1,5-cyclo-octadieneplatinum(II) dichloride was obtained, m. 293-7C.

EXAMPLE 3

Platinum was deposited on nonporous alumina particles by adding 400 g. of the latter to a solution of 2.0 g. of the complex of example 2 in 1,500 ml. of 2-methoxyethanol. The mixture was stirred, refluxed a few minutes, then cooled, filtered, washed with chloroform and methanol, and dried in vacuo. The resulting substrate comprised particles of alumina having a thin coating of platinum in an amount of about 0.1 percent by weight.

EXAMPLE 4

A number of platinum-loaded substrates were prepared by contacting each substrate with a solution of 1,5-cyclooctadiene-platinum(II) dichloride dissolved in 2-methoxyethanol at 110° C., using varying contact times. The amount of platinum deposited was determined in some cases, and is to be compared with the maximum amount which could deposit, namely, 3.5 percent, as the complex was limiting in this respect. The data are listed in table 1:

TABLE 1.—DEPOSITION OF PLATINUM ON VARIOUS SUBSTRATES

| No. | Substrate | Contact time, hrs. | Percent Pt deposited |
|---|---|---|---|
| 1 | Dowex-50W-X4 (—SO₃H) | 18 | [1] N.D. |
| 2 | Amberlyst-15 (—SO₃H) | 6 | 0.68 |
| 3 | Amberlyst-A21 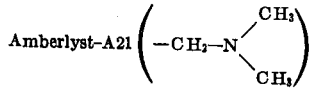 | 18 | [1] N.D. |
| 4 | Amberlyst-IRC-50 (—COOH) | 18 | [1] N.D. |
| 5 | α-Aluminum oxide | 0.1 | 0.10 |
| 6 | γ-Aluminum oxide | 1 | [1] N.D. |
| 7 | Magnesium oxide | 1 | [1] N.D. |
| 8 | Titanium oxide | 18 | [1] N.D. |
| 9 | Chromia-alumina | 18 | [1] N.D. |
| 10 | Silica-alumina | 18 | [1] N.D. |
| 11 | Natural offretite | 4 | 0.22 |
| 12 | Synthetic offretite (H+) | 4 | 0.10 |
| 13 | Synthetic faujasite (HY) | 4 | 0.14 |
| 14 | Synthetic mordenite (Na+) | 4 | 0.34 |
| 15 | Synthetic mordenite (H+) | 4 | 0.72 |
| 16 | Synthetic zeolite (13X) | 4 | 0.69 |
| 17 | Synthetic zeolite (rare earth X) | 4 | 0.53 |

[1] N.D. indicates that the Pt percent was not quantitatively determined.

In table 1 the substrates are grouped according to type, i.e., Nos. 1–4 are ion exchange resins, Nos. 5–10 are metal oxides, and Nos. 11–17 are crystalline aluminosilicate zoolitic molecular sieves. These groups may be discussed briefly in the following paragraphs.

Regarding the ion exchange resins, which are listed by trade name and chemical indication of functional groups, all are styrene-divinylbenzene copolymers. Nos. 1 and 2 are sulfonic acid group-containing resins, No 3 is a dimethylaminomethyl group-containing resin, and No. 4 contained carboxylic acid groups. No. 1 was in the sodium sulfonate form, as received, and required treatment with acid (dilute HCl for 10 minutes at room temperature) to render it active. To deposit platinum on the resins, 10 g. of each resin were suspended in 75 ml. 2-methoxy-ethanol, and 0.5 g. of the complex was added; the mixture was stirred, refluxed for 6 hours, cooled, filtered, the solids washed with chloroform and dried in vacuo. Platinum was found to be distributed as a thin shell on the exterior boundary of the resins.

Platinum was deposited on the metal oxides of Nos. 5–10 substantially according to the procedure set forth in example 3.

The crystalline aluminosilicates are conventionally known as zeolitic molecular sieves and as hydrocarbon conversion catalysts. Nos. 12, 13 and 15 were in what is sometimes referred to as the acid form, the H in parentheses signifying that the zeolite had been treated with acid to at least partly introduce H ions therein. No. 14 was in the sodium salt form. No. 16 was a synthetic X-type zeolite having pore openings of about 9 Angstrom units. No. 17 was an X-type zeolite that had been treated with a rare earth salt to exchange into it a rare earth cation. The formula of X-type zeolite is generally considered to be $$0.9 \pm 0.2 M_{\frac{2}{n}} O : Al_2O_3 : 2.5 \pm 0.5 \, SiO_2 : YH_2O$$

where M is a cation, $n$ is its valence, and Y has a value of up to 8. The foregoing zeolites are described in such U.S. Pat. Nos. 2,882,244; 3,130,007; 3,140,249; 3,210,267; and 3,247,098. Platinum was deposited on each zeolite by dissolving 0.0703 g. of the complex in 10 ml. 2-methoxyethanol, adding 1.0 g. of zeolite, stirring, refluxing for 4 hours, cooling, filtering, washing the solids with chloroform, and air drying the same. As shown, 0.10 to 0.73 percent of platinum deposited. These differences in platinum loading may be the result of the differing pore sizes of the zeolites, it being thought that accessibility to the deposition sites may be controlled by pore size.

With respect to different loadings for all the substrates as a group, this is not fully understood, although it is considered that regions of high acidity or basicity in the substrate favor the decomposition of the complex and deposition of the elemental metal. This belief is reinforced by the fact that no deposition occurred in the absence of the substrates, and no deposition occurred when such untreated (nonactive) materials as polystyrene, silica gel, glass, and Teflon (polyfluoroethylene) were used as substrates.

EXAMPLE 5

When Zeise's acid was substituted for the complex of example 4, and ethanol for 2-methoxyethanol, it was found that decomposition of the complex in the presence of Amberlyst-15 resulted in deposition of platinum throughout the interior pores of the resin. This is in contrast to No. 2 of example 4 where the platinum was deposited on the exterior boundary of the Amberlyst-15.

EXAMPLE 6

Using the method of example 2, 2,5-dimethyl-1,5-hexadieneplatinum(II) dichloride and 1,5-hexadieneplatinum(II) dichloride were prepared. Each complex, in an amount of 0.1 g. was dissolved in 10 ml. 2-methoxyethanol in the presence of 1.0 g. Amberlyst-15, and the mixture processed as for No. 2 of example 4. Platinum was deposited on each substrate: about 37 mg. on the first-named substrate and about 22 mg. on the second.

It will be understood that in forming the deposition solution, the sequence of addition of the complex, alcohol, solvent, and substrate is not material.

The periodic table classifications used herein are based on the arrangement distributed by E. H. Sargent & Co. and further identified by the legend "Copyright 1962 Dyna-Slide Co."

It will be understood that the invention is capable of obvious variations without departing from its scope.

In the light of the foregoing description, the following is claimed.

We claim:

1. The method for the single-step deposition of a metal selected from groups IB, IIIA, IVB, VB, VIB, VIIB, and VIII of the periodic table on the active surfaces of a substrate comprising contacting said substrate with a solution containing an alcohol and a pi-complex of said metal having at least one ligand in the form of an organic group containing at least one carbon-to-carbon multiple bond, said group by virtue of said multiple bond being capable of pi-electron bonding to said metal of said complex, said contacting being carried out at a temperature below the decomposition temperature of said complex, whereby contact of said complex with said active surfaces of said substrate aided by said alcohol effects a surface-induced decomposition of said complex to deposit metal of said complex in elemental form on said active surfaces of said substrate.

2. The method of claim 1 wherein said solution contains pi-complexes of more than one metal whereby said metals of said pi-complexes are deposited in the form of a mixture on said active surfaces of said substrate.

3. The method of claim 1 wherein the substrate is a nonconductor of electricity.

4. The method of claim 1 wherein the substrate comprises particles too small to attach electrodes.

5. The method of claim 1 wherein the complex has at least one other ligand different from said organic group.

6. The method of claim 5 wherein said other ligand is selected from halogen, carbonyl, alkyl, acyl, acyloxy, amine, ammonia, phosphine, cyanide, isocyanide, nitrosyl, alkyl sulfide, aryl sulfide, hydrogen sulfide, thionitrosyl, hydroxy, thiocarbonyl, water, hydride, aryloxy, aroyl, aroyloxy, hydrogen sulfite, thiocyanate, and alkoxy.

7. The method of claim 6 wherein the number of said one ligand varies from 1 to 8, the number of said other ligand varies from 7 to 0, and the sum of the two varies from 2 to 8.

8. The method of claim 7 wherein the number of said one ligand varies from 1 to 2, the number of said other ligand varies from 2 to 6, and the sum of the two varies from 2 to 8.

9. The method of claim 5 wherein said one ligand is derived from an open chain monoolefin.

10. The method of claim 5 wherein said one ligand is derived from an open chain diolefin.

11. The method of claim 5 wherein said one ligand is derived from an open chain oligo-olefin.

12. The method of claim 5 wherein said one ligand is derived from a cyclic diolefin.

13. The method of claim 5 wherein said one ligand is derived from a cyclic oligo-olefin.

14. The method of claim 5 wherein said one ligand is derived from an acetylene.

15. The method of claim 1 wherein said solution comprises said complex dissolved in said alcohol.

16. The method of claim 1 wherein said substrate is a particulate material.

17. The method of claim 16 wherein said substrate comprises particles in the colloid size range.

18. The method of claim 16 wherein the substrate is a crystalline aluminosilicate zeolitic molecular sieve.

19. The method of claim 16 wherein the substrate is a metal oxide.

20. The method of claim 16 wherein the substrate is an ion exchange resin.

21. The method of claim 1 wherein the substrate comprises material with active and nonactive surfaces and wherein metal is selectively deposited on the active surfaces.

22. The method of claim 1 wherein the deposition is carried out continuously.

23. The process of claim 1 wherein said contacting is carried out at a temperature between room temperature and the refluxing temperature of said solution.

* * * * *

UNITED STATES PATENT OFFICE
CERTIFICATE OF CORRECTION

Patent No. 3,622,367      Dated November 23, 1971

Inventor(s) Werner O. Haag and Darrell Duayne Whitehurst

It is certified that error appears in the above-identified patent and that said Letters Patent are hereby corrected as shown below:

In the References Cited, the following should be:
```
2,702,253   2/1955    Bergstrom................117/54
2,719,797   10/1955   Rosenblatt et al.........117/54X
2,930,807   3/1960    Case.....................260/429X
3,265,520   8/1966    Obenshain................117/160X
3,295,999   1/1967    Klein et al..............117/47X
3,402,067   9/1968    Langley..................117/160X
```

Column 2, lines 67 and 68, "Cl'7E', Br'7E', F'7E', and I'7E'." should read --$Cl^-$, $Br^-$, $F^-$, and $I^-$.--

Column 3, line 11, "The 8," should read --The number--.

Column 6, line 10, "decomposition" should read --deposition--;
line 16, "An a" should read --And a--
line 23, "decomposition" should read --deposition--.

Column 7, line 21, under the heading "Percent Pt deposited", "0.72" should read --0.73--.

Signed and sealed this 8th day of August 1972.

(SEAL)
Attest:

EDWARD M. FLETCHER, JR.         ROBERT GOTTSCHALK
Attesting Officer               Commissioner of Patents

UNITED STATES PATENT OFFICE
CERTIFICATE OF CORRECTION

Patent No. 3,622,367    Dated November 23, 1971

Inventor(s) Werner O. Haag and Darrell Duayne Whitehurst

It is certified that error appears in the above-identified patent and that said Letters Patent are hereby corrected as shown below:

Column 7, line 60, that part of the formula reading "$YH_2Q$" should read --$YH_2O$--.

Signed and sealed this 28th day of November 1972.

(SEAL)
Attest:

EDWARD M. FLETCHER, JR.
Attesting Officer

ROBERT GOTTSCHALK
Commissioner of Patents